Patented Mar. 6, 1928.

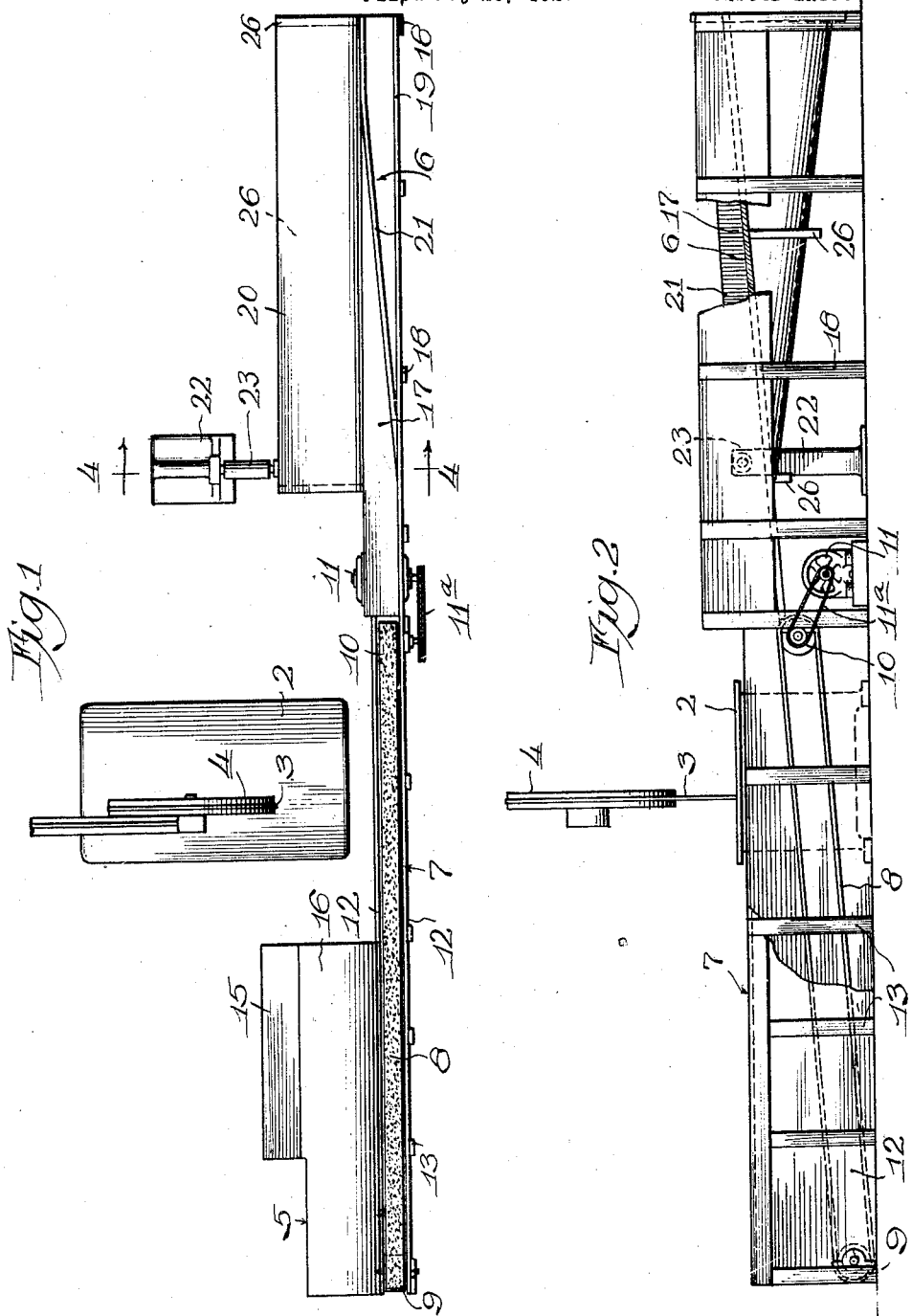

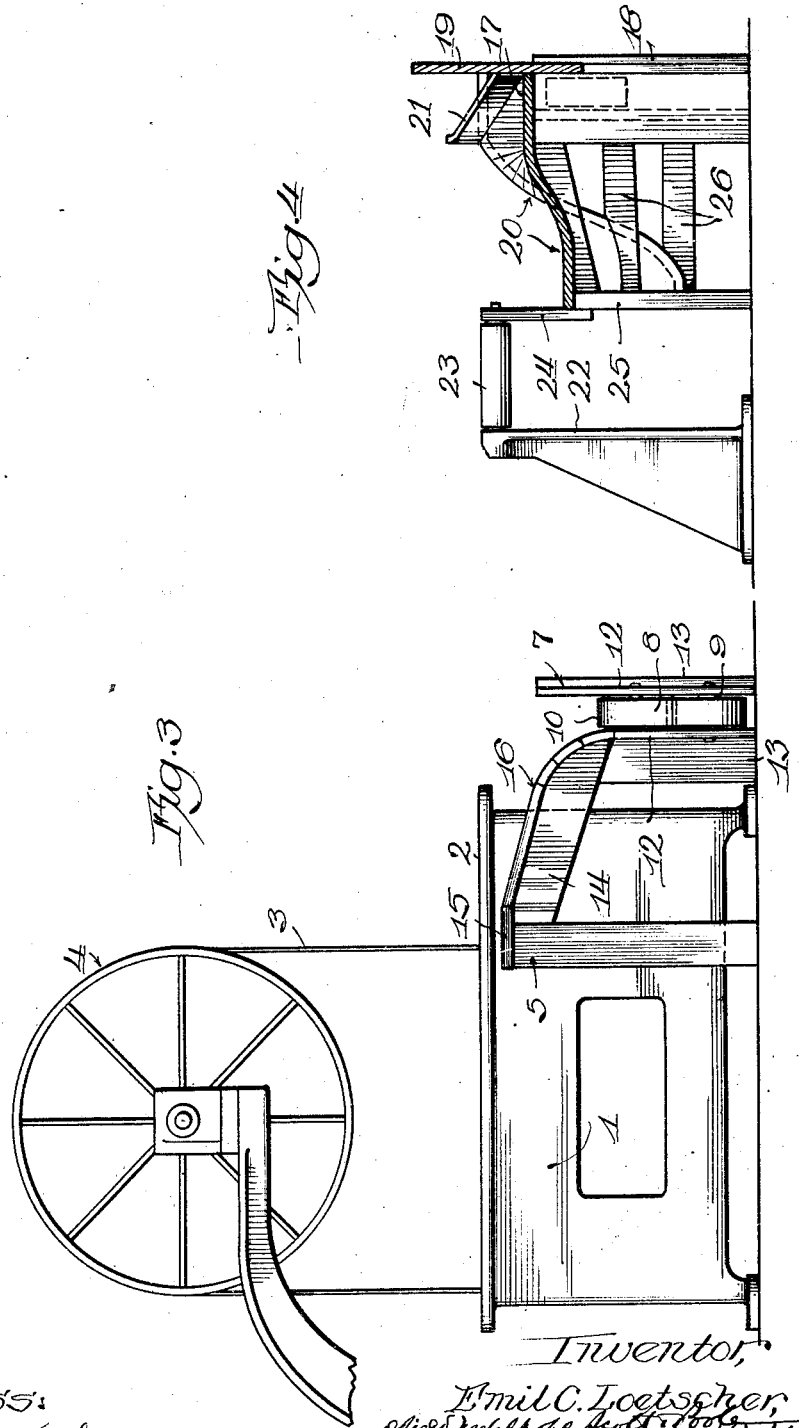

1,661,767

UNITED STATES PATENT OFFICE.

EMIL C. LOETSCHER, OF DUBUQUE, IOWA.

LUMBER-RETURNING DEVICE FOR RIPSAWS.

Application filed May 28, 1927. Serial No. 194,916.

This invention relates to improvements in lumber returning devices designed for use in connection with sawing operations wherein the same piece or pieces of lumber are reduced to smaller pieces by repeated passages through a saw. A familiar example is the cutting or ripsawing of planks or boards into relatively narrow strips, as carried on in a sawmill or a woodworking establishment.

In operations of this character as ordinarily carried out, two operators are required, one standing in front to feed the material through the saw and the other positioned at the rear to handle the "rips" or cut portions and to return the board by hand to the feeding operator. This method is not an efficient one since considerable time is lost between each cutting operation in the handling of the board. The take-off man must not only dispose of the "rips" but must pass the board forwardly and the feeding operator must stand by to receive it and then feed it to the saw.

The purpose of the present invention is to provide a device for automatically returning the boards from the rear to the front of the saw after each cutting operation, and to deliver the same within easy reach at the feeding end and in such a manner that no time is lost and the cutting can be carried on with greatly increased rapidity and consequently with a marked increase in production without any greater effort or labor on the part of the operators.

As a preferred embodiment I have disclosed a typical installation used in connection with a band saw operating to rip boards into narrow strips, although the same device can be adapted for other types of saws and sawing operations.

In the drawings,

Figure 1 is a top plan view of the complete lumber return installation,

Figure 2 is a view in side elevation of the same installation,

Figure 3 is an enlarged view in end elevation on the delivery side of the saw, and Figure 4 is a section taken on line 4—4 of Figure 1, showing the construction of the return device at the feeding side of the saw.

The saw is a vertical band saw of standard design, consisting of a supporting frame or base, a saw table 2, and an endless saw blade or band 3, supported on wheels or pulleys 4 above and below the saw table, only one of which is shown. The boards are fed from right to left along the saw table and in contact with the vertical lead of the blade on the left of the table, when facing the saw from the front or feeding side.

The return device comprises in general a receiving table 5 on the take-off side of the saw, a delivery table 6 on the feeding side, and a conveyor 7 extending along the side of the receiving table 5 and the saw, to the rear end of the delivery table 6. The conveyor preferably consists of an endless belt 8, mounted on pulleys 9 and 10 at opposite ends of the conveyor. As shown in Figure 2 the pulley 9 adjacent the receiving table is located just above the floor level and the pulley 10 at the opposite end is elevated at a higher level but below the saw table, so that the belt 8 is inclined upwardly from the take-off toward the feeding side of the saw. The belt is driven by a motor 11 conveniently located under the delivery table 6 and having driving connection with the shaft of the pulley 10 by a belt or chain 11ª. The conveyor belt and pulleys are partially housed between two vertical walls 12, 12, which form the sides of an open trough of which the top lead of the belt forms the bottom. The belt travels in a clockwise direction so that the movement of the top lead thereof is from left to right or from the receiving toward the delivery table.

The receiving table extends beyond the saw table on the take-off side and in line with the path of the boards being fed through the saw. The length of the table is governed by the length of the material being cut, being of substantially the same length. The table is preferably constructed of wood and is supported on legs 13, 13, and cross-braced by transverse members 14 at intervals throughout its length. The top of the table consists of a relatively narrow ledge or rail 15, in direct line with the plane of the cutting saw, the top of this ledge being horizontal and depressed slightly below the top of the saw table. Extending laterally from the outside edge of the ledge 15 is a downwardly inclined and curved section 16 of the table top, the same presenting a surface inclining rather gradually adjacent the ledge, thence making an abrupt downward bend, and finally terminating in a vertical wall portion coinciding with or forming an integral part of the inner vertical wall 12 of the conveyor housing.

From the foregoing description of the receiving table 5 it will be at once manifest that a board having been fed through the saw, and a portion removed from its inner edge, will come to rest on the ledge, where a slight lateral movement by the "take-off" man will cause it to slide sidewise down the incline by gravity onto the travelling belt and thence be carried forwardly and upwardly in a substantially vertically upright position. In the meantime the "rip" or cut strip is removed by the take-off man and disposed of. In fact, this delivery of the board to the conveyor may be made entirely automatic by decreasing the width of the ledge to such an extent that immediately upon its leaving the saw table it will at once start its sidewise sliding descent, without the intervention of the initial push given to it by the attending operator. Thus with the addition of a suitable device for removing the "rips," it would be possible to dispose with the take-off man entirely. In other words, it is handling of the rips that requires the manual attention at the delivery side of the saw and not the necessity of imparting an initial movement to the boards to be returned.

Referring now to the delivery table of the apparatus, so called because the boards are delivered thereto to be again fed to the saw, the same extends beyond the front of the saw table and in line with the conveyor, in fact, a portion of the table may be considered as a continuation of the conveyor. In some respects the delivery table 6 is similar in construction of the receiving table 5, having a narrow ledge or shelf 17 in alignment with the top lead of the conveyor belt and preferable inclined at the same angle, that is, it forms a stationary prolongation of the conveyor belt of substantially the length of the boards being handled. This narrow shelf or table is level in a transverse direction, and is supported on legs 18 which also support a vertical partition wall 19, extending along the outer edge of the table.

As clearly shown in Figure 1 the conveyor proper terminates just beyond the front edge of, and at one side of the saw table 2, from which point the fixed inclined shelf of the receiving table continues. Thus if the shelf 17, with its outer returning or guiding wall 19 constituted the entire table, the boards on being carried forwardly on the conveyor belt would come to rest on the table with their tail ends just off the conveyor. In this position of delivery they can be reached by the feeding operator and carried forward onto the saw table for the next cutting operation. Although this is a satisfactory arrangement, it is preferred to elaborate the construction somewhat in order to deliver the boards in such position that they can be picked up by the operator without turning around, and thus eliminate the additional time consuming movement and attendant physical effort.

At a distance rearwardly of the front edge of the saw table 2, and extending along the inner side of the shelf or ledge 17, is a laterally and downwardly inclined chute 20, its forward end being spaced some distance beyond the adjacent end of said ledge in order to provide a space for the operator to stand. This chute is considerably wider than the ledge 17, and is so constructed as to present a warped upper surface. Thus at the forward end (Figure 4) of the chute the outer edge is flush with the top of the ledge 17, and thence slopes downwardly at a rather gradual incline to a comparatively level portion along its inner edge, the total drop being perhaps six inches. Continuing rearwardly from the front edge the surface of the chute gradually becomes steeper in transverse sectional contour and the inner marginal portion inclining downwardly until at the rear end the slope is quite abrupt with the inner edge of the chute just above the floor level. Extending longitudinally of the ledge 17, opposite the chute 20, is an oblique rail 21, its forward end being flush with the outer vertical wall 19, and its rear end flush with the inner edge the the ledge.

As the boards are discharged onto the ledge 17 of the receiving table their forward ends strike the oblique rail 21 and are diverted laterally and fall or slide down the relatively steep surface of the chute at its rear end, there being sufficient momentum of the board to carry it rearwardly as it slides laterally and downwardly. The rear end of the board, which now becomes the front end when presented to the saw, finally comes to rest along the inner edge of the chute, the board assuming an inclined position with its end adjacent the saw elevated. Just opposte the forward end of the chute 20, and on the inner side of the receiving table, is an upright standard 22 supporting a horizontal roller 23, in line with the cutting side of the saw. This roller is supported at its outer end by a vertical brace 24 secured to the frame work of the table, consisting of legs 25 and cross members 26, located at intervals throughout the length of the table.

By this arrangement the boards are delivered within reach of the operator who can pick them up, lift them onto the roller 23 and then feed them forwardly to the saw for the next cut, without turning around or moving from his position.

The rapidity of the return operation is governed by the travel of the conveyor belt which is gauged by the length of the lumber being handled and the distance it is to be carried. It is desirable, however, that the speed shall be sufficient to impart sufficient momentum to each board so that it will be carried beyond the operator at the feeding end and finally deposited behind him.

Having set forth a preferred embodiment of the invention, I claim:

1. In a lumber return device, the combination with a saw, of a receiving table located beyond the take-off side of said saw and comprising a relatively narrow flat shelf in line with the path of the material therethrough, and a transverse downwardly inclined surface on one side of said shelf, a conveyor extending from said receiving table forwardly toward the feeding side of said saw and a delivery table extending beyond the delivery end of said conveyor.

2. In a lumber return, the combination with a saw, of a receiving table located beyond the take-off end of said saw and comprising a flat portion in line with the path of the material through said saw, and a transversely downwardly inclined portion, a conveyor extending from the lower edge of said inclined portion of the receiving table forwardly to the feeding side of said saw, a delivery table located beyond the end of said conveyor and adapted to receive the material discharged therefrom and means for shifting the material laterally by gravity from said delivery table into feeding position.

3. In a lumber return, the combination with a saw, of a receiving table located beyond the take-off end of said saw and comprising a relatively narrow ledge in line with the path of the material through said saw and a transversely downwardly inclined surface extending from one side of said ledge and terminating in a vertical portion, a conveyor extending from the lower edge of the vertical portion of said inclined surface of the receiving table forwardly beyond the feeding side of said saw, and a delivery table located beyond the end of said conveyor and adapted to receive the material discharged therefrom.

4. In a lumber return, the combination with a saw, a receiving table extending beyond the take-off side of said saw and in line with the path of the material therethrough, said receiving table comprising a laterally and downwardly curved surface terminating in a vertical edge, a conveyor extending lengthwise of said receiving table below the lower edge of said inclined surface, said conveyor comprising an endless belt inclined upwardly and terminating beyond the feeding side of said saw, and a delivery table extending beyond said conveyor and comprising a relatively narrow ledge in line with the active surface of said belt, and a laterally and downwardly inclined surface sloping from the edge of said ledge adjacent said saw, and means for displacing the material from said ledge onto said inclined surface.

5. In a lumber return, the combination with a saw, a receiving table extending beyond the take-off side of said saw and comprising a relatively narrow shelf in line with the path of the material therethrough and a transverse and downwardly inclined and curved surface terminating in a vertical edge, a conveyor extending lengthwise of said receiving table and comprising an endless belt extending adjacent said receiving table and below the lower edge thereof and in an upwardly inclined direction beyond the feeding side of said saw and a delivery table beyond said conveyor comprising a relatively narrow ledge in line with the active surface of said belt, a laterally and downwardly inclined surface sloping from the edge of said ledge adjacent said saw, and a rail extending lengthwise and obliquely of said ledge for displacing the material from said ledge onto the inclined surface of said delivery table.

6. In a lumber return, the combination with a saw, of a receiving table beyond the take-off side of said saw, a delivery table beyond the feeding side of said table, a conveyor extending along one side of said saw from said receiving table to said delivery table, and adapted to receive the material to be returned from said receiving table, said delivery table comprising a warped surface inclined downwardly and laterally from one edge in line with said conveyor, and also inclined downward from its front to rear end.

Signed at Dubuque, Ia., this 23 day of May, 1927.

EMIL C. LOETSCHER.